United States Patent [19]

Lorentzen

[11] 4,107,051

[45] Aug. 15, 1978

[54] OIL SORBING MAT

[75] Inventor: Alan P. Lorentzen, White Bear Township, Ramsey County, both of Minn.

[73] Assignees: David J. Bucheck, North Saint Paul; Minnesota Mining and Manufacturing Company, Saint Paul, Minn.

[21] Appl. No.: 774,669

[22] Filed: Mar. 4, 1977

[51] Int. Cl.² .......................... B01D 39/14; B32B 5/12
[52] U.S. Cl. .................. 210/500 R; 428/109; 428/136; 428/233; 428/255; 428/339; 428/910; 210/DIG. 26
[58] Field of Search ................. 428/35, 105, 107, 109, 428/110, 136, 226, 232, 233, 255, 337, 339, 910; 210/40, 508, DIG. 26, 500 R

[56] References Cited

U.S. PATENT DOCUMENTS

| 3,654,060 | 4/1972 | Goldman | 428/136 |
|---|---|---|---|
| 3,881,211 | 5/1975 | Rhodes | 210/DIG. 26 |
| 3,900,629 | 8/1975 | Spencer | 428/136 |
| 3,966,597 | 6/1976 | Omori et al. | 210/DIG. 26 |

Primary Examiner—William R. Dixon, Jr.
Attorney, Agent, or Firm—Cruzan Alexander; Donald M. Sell; Roger R. Tamte

[57] ABSTRACT

Oil sorbing mat comprising a plurality of sections of expanded fibrillated film assembled into an integral structure in which the sections are juxtaposed, with openings in the juxtaposed sections overlapped to establish a network of interstices into which oil can be received and stored.

10 Claims, 4 Drawing Figures

OIL SORBING MAT

BACKGROUND OF THE INVENTION

The viscosity of oil that will be sorbed in useful amounts by an oil sorbing mat is an important factor in judging the utility of the mat. The most successful and widely used oil sorbing materials are best used with medium-viscosity oils (10 to 1000 centipoises). When an attempt is made to use such materials with higher-viscosity oils (1000 to 100,000 centipoises), the reduced flowability of the oils interferes with the sorbing action of the oil-sorbing materials, and greatly limits the amount of oil that the materials will sorb.

The most successful commercial materials for sorbing high-viscosity oils are oil sorbing masses, on the order of 30 centimeters in diameter, of strips of polymeric film grouped and attached together like a pom pom. When such an oil sorbing mass is cast onto an oil spill, oil penetrates between and covers the strips, and a proportion of the penetrated oil is retained when the mass is removed from the spill.

However, such oil sorbing masses do not have the same efficiency as oil sorbing materials used on medium-viscosity oils. For example, when oil sorbing masses as described are used on oil spills of No. 5 fuel oil having a viscosity of about 6000 centipoises (i.e. at a temperature of about 24° C), the sorbency number for the oil sorbing mass is about 15 (sorbency number is the weight of the sorbent after it has been immersed in oil for 5 minutes and then suspended in air and allowed to drain for 5 minutes; minus the weight of the sorbent when dry; divided by the weight of the sorbent when dry). By contrast, oil sorbents useful with medium-viscosity oils generally have sorbency numbers of 20 or more. The difference between 15 and 20 in sorbency number is important, since an oil sorbent having a sorbency number of 20 will sorb at least one-third again as much oil as an oil sorbent having a sorbency number of 15. The practical result of the inferior oil sorbency number is that clean-up operations for spills of high-viscosity oils require unsatisfactorily large amounts of sorbent material and unsatisfactorily long times to complete.

SUMMARY OF THE INVENTION

Briefly, an oil sorbing mat of the invention comprises a plurality of sections of expanded fibrillated film assembled into a flexible resilient handleable and integral structure in which the sections are juxtaposed, with openings in the juxtaposed sections overlapped to establish a network of interstices into which oil can be received and stored. Fibrillated film, as that term is used herein, means film that has been formed with a myriad number of generally parallel cuts closely spaced on an axis transverse to the direction of the cuts and staggered along a longitudinal axis so as to leave an integral structure that may be expanded, i.e. stretched transverse to the direction of the cuts, to form a lightweight net-like structure. Conventionally, after a film has been fibrillated it is twisted into a twine or rope, but in the present invention it is used in an expanded form in which the transverse width of the film is at least twice the transverse width of the film prior to fibrillation.

The fibrillated film may be incorporated into mats of the invention in a generally flat sheet form or in various degrees of distortion out of a flat sheet, and they may be assembled together in a variety of ways. In one preferred form of mat of the invention, generally flat sheets are laid one over the other in a stack and attached together to form a low-density bulky structure having a high void volume. In another embodiment, smaller sections of fibrillated film are grouped and held inside a net-like bag to form a pillow-like structure. In all of these forms the juxtaposed sections of expanded fibrillated film are closely spaced, with the openings of the film overlapped or in communication with one another, so that in combination the plurality of sections of fibrillated film form a network of interstices into which oil can be received and stored.

Mats of the invention comprising the described plurality of fibrillated film sections are found to be especially useful in sorbing high-viscosity oils. For example, the sorbency number for mats of the invention with No. 5 fuel oil at 24° C (6200 centipoises) is at least 20, and preferably is at least 30. While the full explanation for the high sorbency values is not known, it appears that the mass of fibrillated film provides an advantageous number and size of interstices into which high-viscosity oils will penetrate and be retained. Mats of the invention do not appear to operate by virtue of capillary action; but when they are immersed into a quantity of high-viscosity oil, as by gravity or forceful manipulation, and then removed, oil is found to have penetrated into the mat and most of the penetrated oil is retained after removal of the mat.

DETAILED DESCRIPTION

Figure 1:
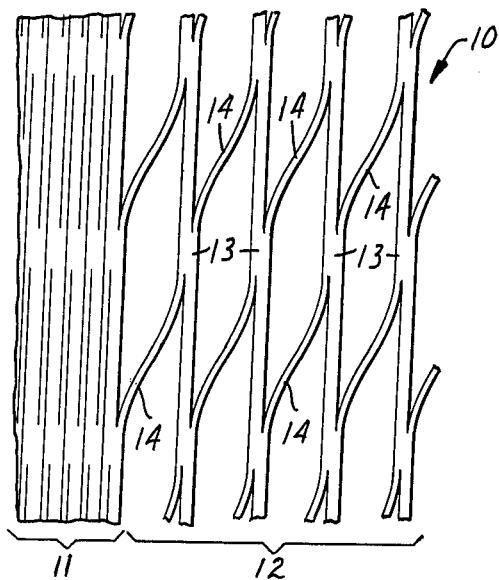
FIG. 1 is a greatly enlarged plan view of a fragment of fibrillated film a portion of which has been expanded.

A fragment of a representative fibrillated film 10 is shown in FIG. 1. The portion 11 of the fragment of film is shown prior to expansion, while the portion 12 is shown in a state of expansion to represent its condition in an oil sorbing mat of the invention. The fiber-like segments of the film may be classified as stem portions 13 and branch portions 14. Representative dimensions are a width of 0.5 millimeter (20 mils) for the stem portions 13 and of 0.125 millimeter (5 mils) for the branch portions 14, and a thickness of 0.05 millimeter (2 mils) for the film. However, these dimensions can be varied quite widely, to increase, for example, tensile strength of a mat of the invention.

Figure 3:
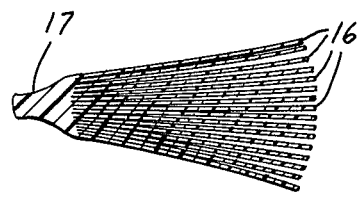
FIG. 3 is an enlarged schematic sectional view along the lines 3—3 in FIG. 2.
Figure 2:
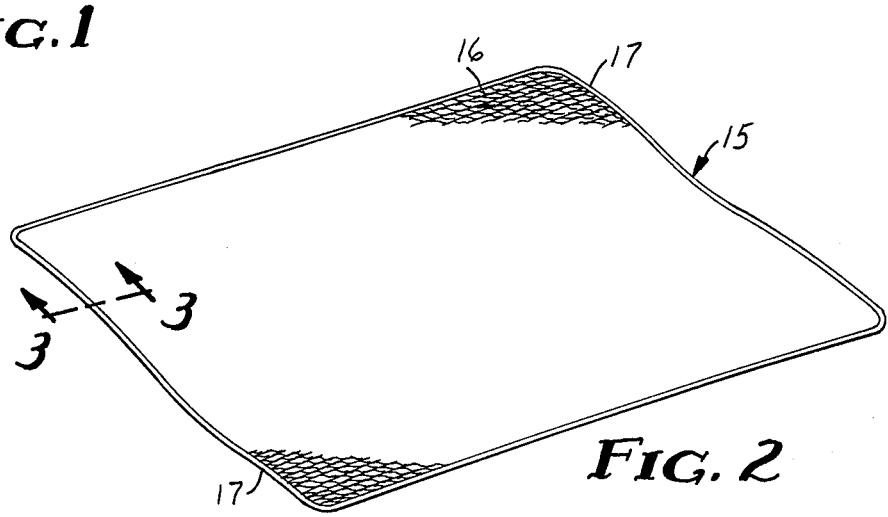
FIGS. 2 and 4 are perspective views of two different illustrative oil sorbing mats of the invention.

A first form of oil sorbing mat 15 of the invention is shown in FIGS. 2 and 3. Sections 16 of expanded fibrillated film are laid one over the other and their edges adhered together at 17. In such a juxtaposition, openings of the overlaid sections of fibrillated film overlap and connect with one another so as to establish a network of interstices. The expanded fibrillated film typically forms a very lightweight net-like structure, leaving large-diameter, extensive interstices and giving the structure a high void volume and a low bulk density. For example, 20 layers or more are generally used to prepare a mat of about 1 centimeter thickness and 0.02 gram/cubic centimeter bulk density. Since the films tend to distort somewhat when stretched to an expanded condition, the mat 15 becomes somewhat fluffy and lower in bulk density.

To increase the strength of a mat of the type shown in FIG. 2, the direction of the longitudinal axes of the fibrillated film sections may be varied in different layers. In addition, reinforcement may be incorporated into the mat, generally as a length of material other than expanded fibrillated film extending along at least one dimension of the mat. For example, reinforcing strands or ropes may be attached to the edges or other locations of the mat, or scrims or nets may be incorporated in the middle of the mat. One illustrative kind of reinforcing net is a netting of polypropylene filaments woven together to leave square openings about 5 millimeters on a side.

In assembling layers of film into a mat as shown in FIG. 2, the sections of film can be stretched transversely by hand or by various mechanical devices such as a tenter frame or a tow spreader. After being stretched, the expanded film can be set with heat from infrared lamps or by brief exposure in an oven heated to a temperature within the approximate range 60°-100° C. At this point, the sheets can be stacked until the desired number of layers is obtained, and the layers then attached together. Any attaching technique can be used, such as heat-sealing (heating the edges while they are under pressure), ultrasonic welding, coating with adhesive, sewing, etc. Desirably the layers are attached together at the edges, though they can be attached instead or in addition at other locations, such as along the middle of the mat. Although the sections of film laid one over the other are usually separate from one another, they may also be folds or windings of a single length of film.

Figure 4:
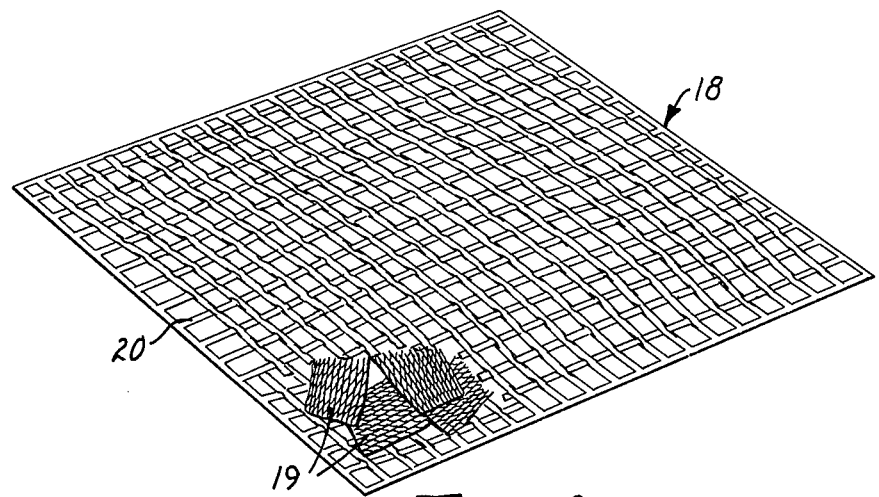

Mats that are more dense than described above are also useful, though generally the bulk density of a mat of the invention (determined using visual estimates of the size of the mat, i.e. of the average thickness of a generally flat mat of the invention as shown in FIGS. 2 and 4) is not more than about 0.1 gram per cubic centimeter, and preferably is less than about 0.05 gram per cubic centimeters. For a variety of purposes weight can be added to a mat of the invention in addition to the weight of the fibrillated film, e.g. as a bag in which the sections are held, or as reinforcement; but the above numbers refer to the bulk density of the fibrillated film by itself.

FIG. 4 shows a different embodiment of oil sorbing mat 18 the invention in which loose sections 19 of expanded fibrillated film are stuffed inside a net-like bag 20, e.g. a bag formed from open-mesh fabric. The most preferred form for such loose fibrillated film sections is as small flat sections, e.g. 10 centimeters or less on their longitudinal and transverse axes, cut from a larger web. The film in the sections should be expanded as in other embodiments, and it has been found that such fibrillated film sections expanded and then heated will remain in expanded form when in place in a net-like bag.

Preferred fibrillated films for use in the invention are made from polyolefins such as polyethylene, polypropylene or polystyrene which have good oleophilic properties, but other polymers are also useful such as polyesters, polyvinyl alcohol and nylon. Most conveniently, film is obtained in flat film form, though film that was initially wound or rolled together as a tow can also be expanded and used in a mat of the invention.

Mats of the invention will take different sizes and shapes for different kinds of use. Oil sorbing mats as shown in FIGS. 2 and 4 are useful to cast onto an oil spill to absorb and clean up the oil spill. When containment as well as absorption of an oil spill is needed, an elongated boom several meters in length may be used. Such a boom may take different cross-sectional shapes, from generally flat or web-like in the manner illustrated by the flat mats shown in FIGS. 2 and 4 to a circular cross section formed by rolling expanded fibrillated film on itself or on a reinforcing strand, or by inserting sections of fibrillated film in an outer net. For most uses the average thickness or diameter of the mass of fibrillated film in a mat of the invention is not large — e.g. less than about 5 centimeters, and preferably less than about 2 centimeters — so that the mat can be conveniently and quickly filled with oil and to minimize the weight of the oil-filled web.

The invention will further be illustrated by the following examples.

EXAMPLE 1

Twenty layers of expanded fibrillated polypropylene film 24 centimeters by 24 centimeters (24 centimeters by 5 centimeters before fibrillation) were laid up one upon the other and heat sealed in an approximately 5-millimeter width around the edges. The bulk density of the mats averaged about 0.02 gram/cubic centimeter and they had a thickness of about 1.25 centimeters. (Twenty-six layers were used in Examples 1D, 1E and 1F in the table below.) Samples of the mats were tested by immersing them into No. 5 fuel oil for 5 minutes, then removing and letting them drain freely while suspended in air for 5 minutes, and then weighing them. The test was repeated with the fuel oil held at different temperatures (to give different viscosities). As a comparison the tests included commercial oil sorbents comprising polypropylene strips about 3 millimeters wide, and 0.05 millimeter thick tied together at one point to form ball-like pom poms about 10 centimeters in bulk diameter. Results are shown below.

Table I

| No. 5 fuel oil at room temperature having a viscosity of 6200 centipoises | | | | |
|---|---|---|---|---|
| Example No. | Dry Weight (grams) | Oil Soaked Weight (grams) | Sorbency Number | |
| 1A | 13.6 | 389.3 | 28.0 | Mats of the Invention |
| 1B | 9.6 | 329.0 | 36.6 | |
| 1C | 10.5 | 357.0 | 33.2 | |
| Comparative Example No. | | | | |
| M | 24.4 | 401.4 | 15.5 | Comparative Examples |
| N | 24.8 | 399.0 | 15.2 | |
| O | 25.6 | 399.9 | 14.7 | |

Table II

| No. 5 fuel oil at 16° C having a viscosity of 17,000 centipoises | | | | |
|---|---|---|---|---|
| Example No. | Dry Weight (grams) | Oil Soaked Weight (grams) | Sorbency Number | |
| 1D | 12.2 | 700.3 | 56.4 | Mats of the Invention |
| 1E | 11.5 | 600.8 | 51.2 | |
| 1F | 14.8 | 812.8 | 53.9 | |
| Comparative Example No. | | | | |
| P | 23.9 | 513.2 | 20.5 | Comparative Examples |
| Q | 23.4 | 528.5 | 21.5 | |
| R | 24.1 | 584.1 | 23.2 | |

Table III

| | No. 5 fuel oil at 5° C having a viscosity of 108,000 centipoises | | | |
|---|---|---|---|---|
| Example No. | Weight (grams) | Weight (grams) | Sorbency Number | |
| 1G | 9.9 | 938.2 | 93.6 | Mats of the Invention |
| 1H | 12.1 | 1030.5 | 84.1 | |
| 1I | 9.5 | 865.9 | 90.1 | |
| Comparative Example No. | | | | |
| S | 26.2 | 1136.8 | 42.4 | Comparative Examples |
| T | 24.0 | 677.8 | 27.4 | |
| U | 31.0 | 1112.0 | 35.0 | |

EXAMPLE 2

A mass of flat fibrillated film sections approximately 7 centimeters by 7 centimeters were placed in a bag about 13 centimeters by 23 centimeters made from open-mesh fabric in which the openings were approximately 5 millimeters square to produce a pillow-like oil sorbent having a bulk density of about 0.01 gram per cubic centimeter. When tested for oil sorbency with No. 5 fuel oil at 24° C (6200 centipoises), the results were as follows:

| Dry Weight (grams) | Oil Soaked Weight (grams) | Sorbency Number |
|---|---|---|
| 20.4 | 608.6 | 28.8 |

What is claimed is:

1. Oil sorbing mat comprising a plurality of sections of fibrillated film which are (a) expanded at least four times their transverse width prior to fibrillation to form a net-like structure and (b) assembled one over the other and attached in said expanded condition to form a fluffy bulky flexible resilient handleable integral structure having a bulk density of about 0.02 gram per cubic centimeter or less in which the openings in the sections are overlapped to establish a network of interstices into which oil can be received and stored, said mat having a sorbency number with No. 5 fuel oil at 24° C of at least 20.

2. A mat of claim 1 in which the sections of fibrillated film are arranged in layers stacked one over the other and attached together.

3. A mat of claim 2 which includes at last 20 layers of fibrillated film.

4. A mat of claim 2 in which the longitudinal axis of at least one layer of fibrillated film is oriented in a different direction from the longitudinal axis of other layers of fibrillated film.

5. A mat of claim 1 in which the sections of fibrillated film are in random arrangement inside a net-like bag.

6. A mat of claim 5 in which the sections of fibrillated film have a length along their longitudinal axis of about 10 centimeters or less.

7. A mat of claim 1 which has a sorbency number of at least 30.

8. A mat of claim 1 in which said fibrillated film is uniformly cut to form a regularly patterned net-like structure.

9. A mat of claim 1 which includes a length of material other than expanded fibrillated film extending along at least one dimension of the mat as reinforcement.

10. A mat of claim 9 in which said length of material comprises an open-mesh fabric sandwiched between layers of fibrillated film.

* * * * *

UNITED STATES PATENT OFFICE
CERTIFICATE OF CORRECTION

Patent No. 4,107,051    Dated August 15, 1978

Inventor(s) David J. Bucheck et al.

It is certified that error appears in the above-identified patent and that said Letters Patent are hereby corrected as shown below:

On the cover sheet, the first inventor should be inserted to read -- David J. Bucheck, North Saint Paul, Minn. --.

Column 5, Table III, the 2nd and 3rd columns should be headed to read as follows:

-- Dry Weight (grams)    Oil Soaked Weight (grams) --.

Signed and Sealed this

Eighth Day of May 1979

[SEAL]

Attest:

RUTH C. MASON
*Attesting Officer*

DONALD W. BANNER
*Commissioner of Patents and Trademarks*